(12) United States Patent
Emani et al.

(10) Patent No.: US 8,869,125 B2
(45) Date of Patent: Oct. 21, 2014

(54) SYSTEMS AND METHODS FOR DEMARCATING INFORMATION RELATED TO ONE OR MORE BLOCKS IN AN APPLICATION

(71) Applicant: Infosys Limited, Bangalore (IN)

(72) Inventors: Murali Krishna Emani, Hyderabad (IN); Sudeep Mallick, Bangalore (IN); Balkrishna Prasad, Bangalore (IN)

(73) Assignee: Infosys Limited, Bangalore (IN)

(*) Notice: Subject to any disclaimer, the term of this patent is extended or adjusted under 35 U.S.C. 154(b) by 186 days.

(21) Appl. No.: 13/714,241

(22) Filed: Dec. 13, 2012

(65) Prior Publication Data

US 2013/0167129 A1 Jun. 27, 2013

(30) Foreign Application Priority Data

Dec. 27, 2011 (IN) ............ 4596/CHE/2011

(51) Int. Cl.
*G06F 9/45* (2006.01)
(52) U.S. Cl.
CPC *G06F 8/41* (2013.01); *G06F 8/443* (2013.01); *G06F 8/45* (2013.01)
USPC .......................................... 717/149; 717/151

(58) Field of Classification Search
CPC .......... G06F 8/41; G06F 8/443; G06F 8/445; G06F 8/45
USPC .................................................. 717/140–161
See application file for complete search history.

(56) References Cited

U.S. PATENT DOCUMENTS

| | | | | |
|---|---|---|---|---|
| 4,667,290 | A * | 5/1987 | Goss et al. .................. | 717/147 |
| 7,624,385 | B2 * | 11/2009 | Waddington et al. ......... | 717/143 |
| 8,117,606 | B2 | 2/2012 | Chakrabarti et al. | |
| 2006/0225052 | A1 * | 10/2006 | Waddington et al. ......... | 717/136 |
| 2008/0222616 | A1 * | 9/2008 | Cheng et al. .................. | 717/137 |
| 2008/0300851 | A1 * | 12/2008 | Chakrabarti et al. .......... | 703/22 |

* cited by examiner

*Primary Examiner* — Qing Chen
(74) *Attorney, Agent, or Firm* — LeClairRyan

(57) ABSTRACT

The invention relates to a system and method for demarcating information related to one or more blocks in an application source code. This invention provides a means to annotate block information in the source code. It parses the application source code to generate an abstract syntax tree and instruments the source code to capture information related to the one or more blocks generated at the time of dynamic analysis of the application. The information related to the one or more blocks are stored in Hash Map and based on this information the abstract syntax tree is modified to add the information related to the one or more blocks and inserting this information in the application source code.

24 Claims, 4 Drawing Sheets

SYSTEMS AND METHODS FOR DEMARCATING INFORMATION RELATED TO ONE OR MORE BLOCKS IN AN APPLICATION

This application claims the benefit of Indian Patent Application Filing No. 4596/CHE/2011, filed Dec. 27, 2011, which is hereby incorporated by reference in its entirety.

FIELD

The present invention relates to the demarcation of a place in an application source code where parallelism can be implemented, and particularly, to systems and methods for demarcating information related to one or more blocks in an application.

BACKGROUND

The parallel execution of modules of source code lead to overall execution performance enhancement, provided such parallel execution opportunities exist in the existing code base. To achieve this, the programmer needs to identify the opportunities of parallel execution in existing code and create an annotation process by which such opportunities are easily demarcated in existing legacy code bases which can potentially be very large. Such demarcation through a form of automated annotation would help the analyzer to clearly identify how to re-modularize the code base so that the identified parallel execution opportunities are realized in the modified code.

Existing technologies may identify a potential benefit of parallel execution from existing code and represent this information in a graphical format, e.g. in a directed acyclic graph, but that is at a fine grained level constrained to blocks and sub routines. Additionally, the existing state of the art is limited to applying the techniques related to parallel execution at compiler level for unit of code blocks such as program files, classes and sub-routines.

US 20080300851 discloses assessing the performance of a software application migrated to a grid infrastructure, and describes how dependencies between one or more blocks can be represented in a directed acyclic graph. However, tracing the block denoted by one or more nodes of the directed acyclic graph in a large source code is error prone and expensive. There is no method for tracing an exact place in the application source code which the nodes of the directed acyclic graph denote. This problem may be solved by demarcating one or more block information in the application source code by automated annotation.

SUMMARY

The present invention helps to identify coarse grained parallelism where parallelism opportunities are spanning block, sub-routine and class boundaries. It also helps the analyzer to identify in an automated fashion, the exact locations in the existing code where parallelism can be implemented. This helps the analyzer to analyze large code bases where manual analysis is expensive and error-prone.

According to the present embodiment, a method for demarcating information related to one or more blocks in an application source code is disclosed. The method includes parsing the application source code to generate an abstract syntax tree. Thereafter, an instrumented code is generated to create the one or more blocks in the application source code. The method further includes compiling the instrumented code along with a dynamic analysis code. In accordance with an embodiment of the present invention, one or more blocks are created when a subroutine is called. Thereafter, the information related to the one or more blocks in the application source code are stored in a Hash Map. In accordance with an embodiment of the present invention, the information related to the one or more blocks into the application source code are annotated in the application source code by modifying the AST based on the information related to the one or more blocks stored in the Hash Map.

In an additional embodiment, a system for demarcating information related to one or more blocks in an application source code is disclosed. As disclosed, the embodiment includes a parser configured to generate abstract syntax tree by parsing the application source code, a code instrumentor configured to instrument the source code to create the one or more blocks in the application source code, a block generation module configured to generate one or more blocks at the beginning of a subroutine during a dynamic analysis of the application source code, a Hash Map configured to store information related to the one or more blocks in the application source and an annotating module configured to annotate information related to the one or more blocks into the application source code by modifying the abstract syntax tree based on the information stored in the Hash Map.

In another embodiment, a computer program product for demarcating information related to one or more blocks in an application source code is described. The computer program product includes a computer usable medium having a computer readable program code embodied therein for demarcating information related to one or more blocks in an application source code. The computer readable program code storing a set of instructions configured for parsing the application source code to generate an abstract syntax tree, generating an instrumented code to create the one or more blocks in the application source code, compiling the instrumented code along with a dynamic analysis code, creating one or more blocks at the beginning of a subroutine during a dynamic analysis of the application source code, storing information related to the one or more blocks in the application source code in a Hash Map and annotating information related to the one or more blocks into the application source code by modifying the abstract syntax tree based on the information stored in the Hash Map.

DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a system and method for demarcating information related to one or more blocks in an application source code, where the application source code is parsed to generate an abstract syntax tree and then the code is instrumented to create the one or more blocks in the application source code. Further, the instrumented code is compiled along with a dynamic analysis code. Dynamic analysis creates one or more blocks when a subroutine is called. The information related to the one or more blocks in the application source code is stored in a Hash Map. Further, the information related to the one or more blocks is annotated into the application source code by modifying the abstract syntax tree based on the information stored in the Hash Map.

Figure 1:
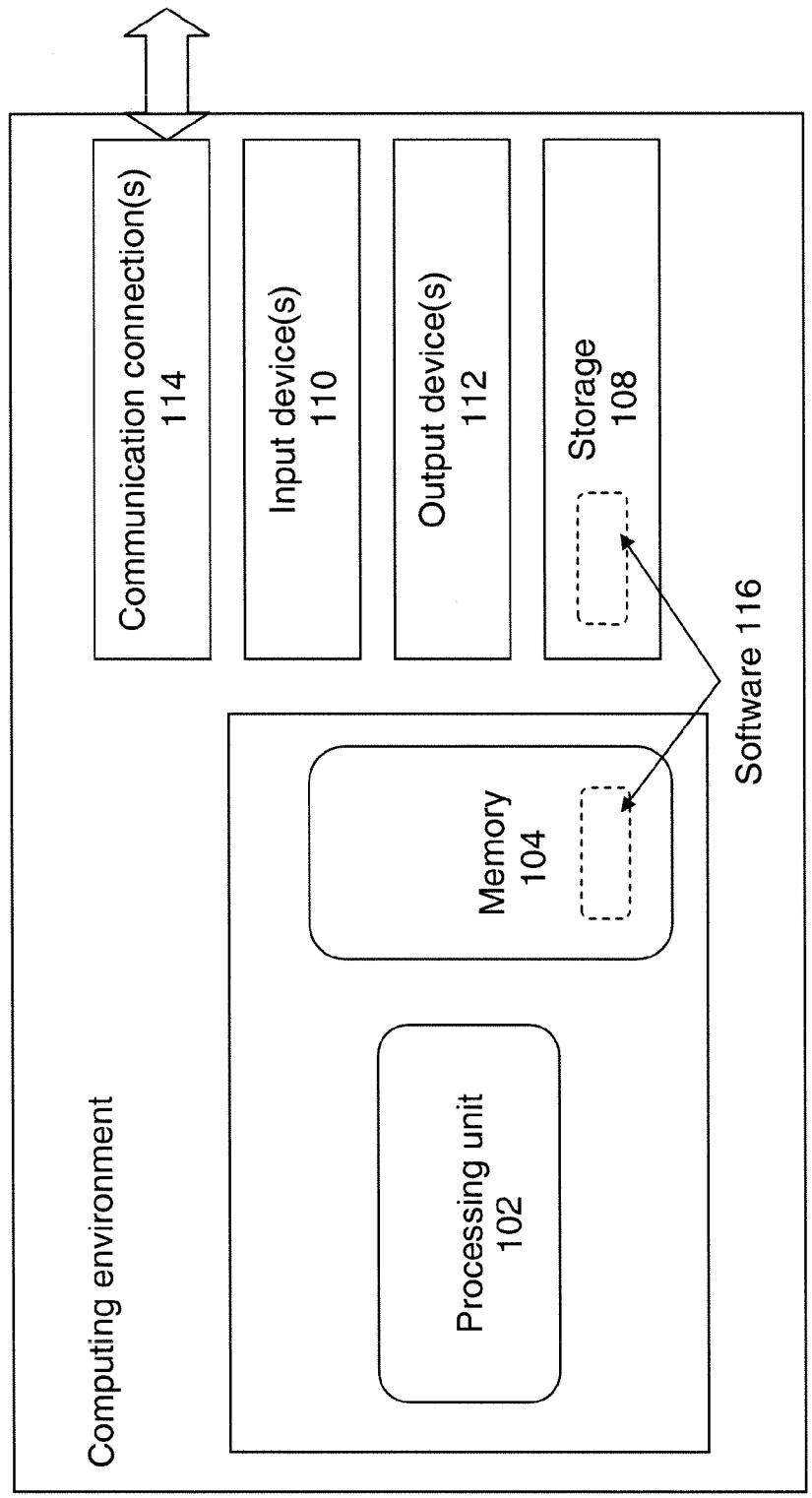
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can, for example, implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
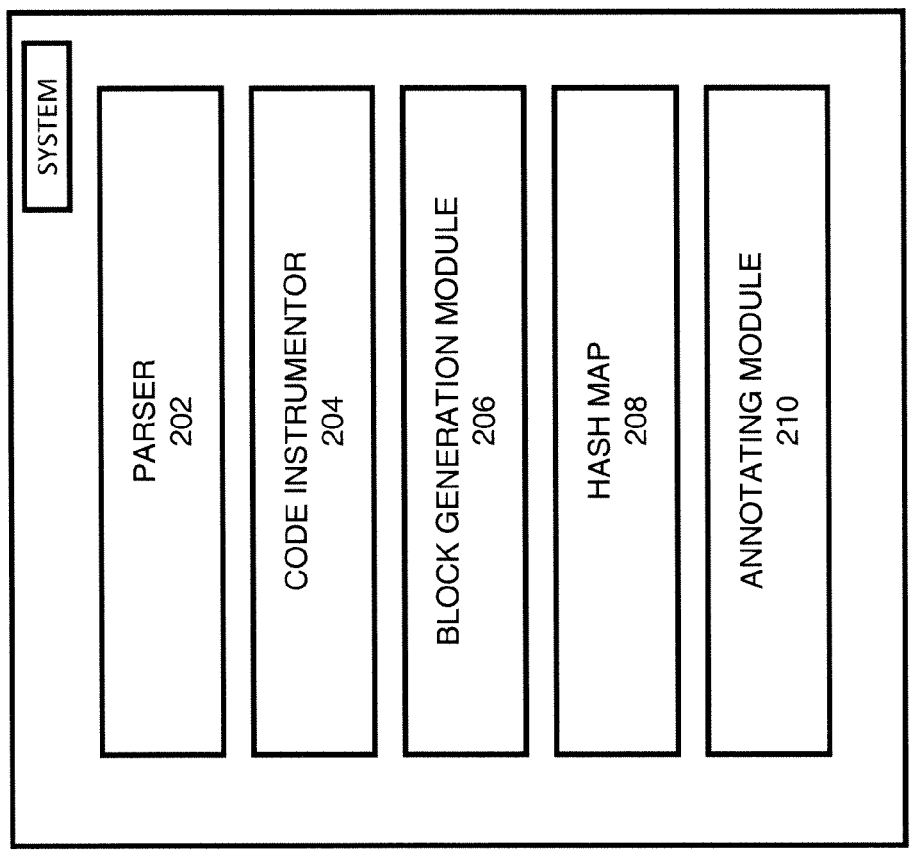
FIG. 2 is a block diagram illustrating a system for demarcating information related to one or more blocks in an application source code, in accordance with an embodiment of the present invention.

FIG. 2 is a block diagram illustrating a system for demarcating information related to one or more blocks in an application source code, in accordance with an embodiment of the present invention. More particularly, in FIG. 2, the system includes a parser 202, a code instrumentor 204, a block generation module 206, a Hash Map 208 and an annotating module 210. In various embodiments of the present disclosure, the parser 202 parses the application source code and generates an abstract syntax tree of the source code. The code instrumentor 204 instruments the source code to create one or more blocks in the application source code. The one or more blocks are one or more units of computation. The code instrumentor 204 inserts one or more nodes to the abstract syntax tree to capture information related to the one or more blocks and then this modified abstract syntax tree is converted to an instrumented code with the help of a language recognition tool. The instrumented code should be compilable. One or more subroutine calls are added to the instrumented code. A block generation module generates one or more blocks when a subroutine is called during a dynamic analysis of the instrumented code. When a block is generated a corresponding block number and block ID are also generated. If the one or more subroutines are one or more loops and if the one or more blocks form inside the one or more loops, then an iteration of the one or more loops generates the one or more block numbers incrementally. The one or more subroutine definitions are part of a dynamic analysis code. In the dynamic analysis the instrumented code is run to create the one or more blocks. The one or more blocks are represented in a directed acyclic graph generated by the dynamic analysis of the instrumented code. An exemplary directed acyclic graph is shown in FIG. 3 and it represents one or more block numbers and one or more block IDs of one or more blocks in an application.

A directed acyclic graph is a standard structure used for representation of application tasks to be scheduled in any distributed system such as clusters or grids. A directed acyclic graph may comprise one or more nodes and edges, wherein a node represents an application task and an edge represents the transfer of data between two application tasks. Each node and edge is associated with a weight where a node weight represents running time of an application task and an edge weight represents a measure of data exchanged between the two nodes or the two tasks connected by the edge. If there are any loops present in the generated directed acyclic graph, the block is split into one or more virtual blocks to maintain the acyclic nature of the directed acyclic graph.

Figure 3:
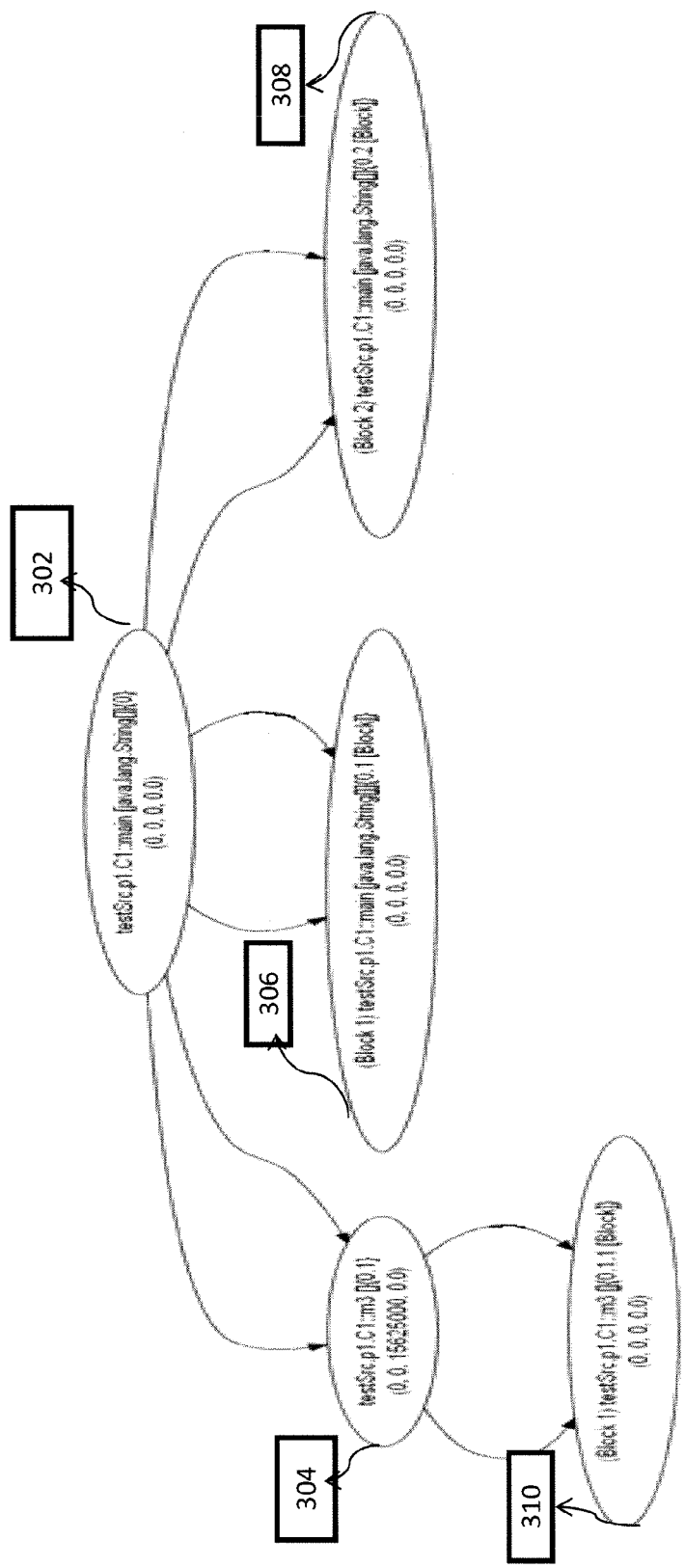
FIG. 3 is an exemplary directed acyclic graph showing dependencies between one or more blocks in an application.

In FIG. 3 the nodes of the directed acyclic graph are shown in 304, 306, 308 and 310 which denote one or more block in an application by showing one or more block numbers associated with one or more block IDs. The one or more block IDs are represented as package names, class names and one or more statements of the application where the one or more subroutines are called in the directed acyclic graph. In a very large code it is very difficult to trace back the exact line number in the code where the one or more blocks are formed. The manual mapping of the same is error prone and expensive. To solve this problem, according to an embodiment of the present disclosure, the one or more statements in the one or more block IDs are mapped to one or more line numbers where the one or more subroutines are formed. The one or more line numbers are obtained from the abstract syntax tree and mapped with the one or more block IDs in the directed acyclic graph. Thus the one or more block IDs comprise package name, class name and the one or more line numbers. The one or more block numbers are generated when the one or more blocks are formed.

The Hash Map stores the information related to the one or more blocks in the application source code. Information related to the one or more block numbers and the one or more block IDs are stored in the Hash Map as one or more values and one or more key entries respectively. As is known in the art, a hash table is a data structure that associates keys with values, and enables a lookup function wherein a key value is used to find a corresponding entry in the table. With the help of the information related to the one or more blocks in the application stored in the Hash Map the one or more block IDs are mapped with the one or more block numbers. An exemplary mapping of the one or more block IDs with the one or more block numbers may be as follows:

| Block ID | Block number(s) |
| --- | --- |
| Block ID: testSrc.p1.C1::72 | Block #: 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 |
| Block ID: testSrc.p1.C1::24 | Block #: 1 |
| Block ID: testSrc.p1.C1::26 | Block #: 2 |
| Block ID: testSrc.p1.C1::81 | Block #: 33 34 35 36 37 38 39 40 41 42 |

The annotating module annotates the information related to the one or more blocks in the application source code. More particularly, the annotating module adds information related to the one or more block numbers as one or more comments in the abstract syntax tree. Thus the source code will show the one or more block numbers at one or more places in the application where the one or more blocks are formed and the source code with the information related to the one or more blocks is called tagged source code.

Figure 4:
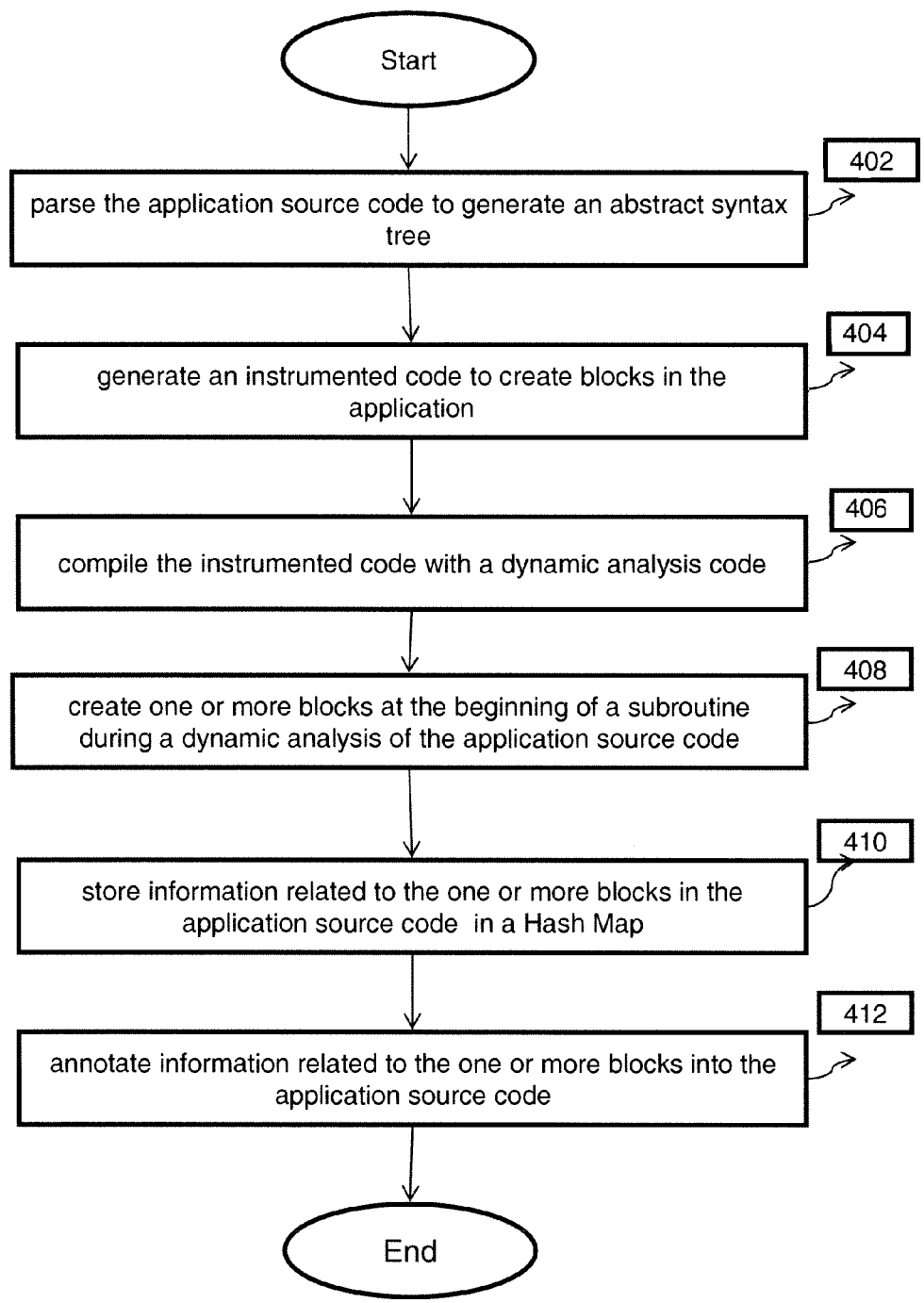
FIG. 4 depicts an implementation of the demarcating information related to one or more blocks in an application source code, in accordance with an embodiment of the present invention.

FIG. 4 depicts an implementation of the demarcating information related to one or more blocks in an application source code. Aspects of the present implementation include parsing the application software to generate an abstract syntax tree, at 402. Thereafter, at 404, the code is instrumented to create one or more blocks in the application source code. The one or more blocks are the units of computation. The code instrumentation includes adding one or more nodes in the abstract syntax tree to capture information related to one or more blocks. The instrumented abstract syntax tree is converted to a code, called an instrumented code, using a language recognition tool. The instrumented code is compilable. One or more subroutine calls are added to the instrumented code so that a dynamic analysis can create one or more blocks in the application. The one or more subroutine definitions are part of a dynamic analysis code. After that, the instrumented code is compiled along with the dynamic analysis code, as in 406. The one or more blocks are created during the dynamic analysis when the one or more subroutines are called at 408. In the dynamic analysis the instrumented code is run to create the one or more blocks. The dynamic analysis also generates one or more block numbers and one or more block IDs. The one or more block numbers are generated when the one or more blocks are created. If the one or more subroutines are one or more loops and if the one or more blocks form inside the one or more loops then iteration of the one or more loops increment the one or more block numbers accordingly, but the one or more block numbers are generated by a loop iteration in the application are associated with the same block IDs as the line number in the application where the one or more subroutines are formed is same. The one or more block numbers and the one or more block IDs are represented in a directed acyclic graph as shown in FIG. 3. The directed acyclic graph comprises one or more nodes and edges, wherein a node represents an application task and an edge represents the transfer of data between two application tasks. The nodes of the directed acyclic graph represent the one or more blocks and denote the one or more block numbers and the one or more block IDs. The one or more block IDs are represented as package names, class names and one or more statements of the application where the one or more subroutines are formed. In a very large code it is very difficult to trace back the exact line number in the code where the one or more blocks are formed. The manual mapping of the same is error prone and expensive. This problem is solved in the present disclosure. The one or more statements in the one or more block IDs are associated with one or more line numbers where the one or more subroutines are formed. Therefore the one or more block IDs comprise the one or more line numbers instead of the one or more statements of the application. The one or more line numbers are obtained from the abstract syntax tree.

Referring back to FIG. 4, the information related to one or more blocks are stored in a Hash Map at 410. The Hash Map stores the information related to the one or more block IDs as one or more key entries and the one or more block numbers are as one or more values. With the help of the information related to the one or more blocks in the application stored in the Hash Map the one or more block IDs are mapped with the one or more block numbers. Thus every block ID is associated with one or more block numbers. After mapping the one or more block IDs with the one or more block numbers, at 412, the application source code is annotated with the information related to the one or more blocks. The information related to the one or more block numbers are inserted as one or more comments in the abstract syntax tree. More particularly, the information related to one or more block numbers are inserted based on the one or more line numbers in the one or more block IDs. The source code with inserted block information is called tagged source code which demarcates the one or more block numbers in the source code thus the programmer can trace back the exact places in the source code which the directed acyclic graph denotes. Table 1 shows an exemplary code and its corresponding tagged code.

TABLE 1

| Original source code | Tagged Source code |
| --- | --- |
| package testSrc.p1; | package testSrc.p1; |
| import testSrc.p2.*; | import testSrc.p2.*; |
| import testSrc.p3.*; | import testSrc.p3.*; |
| public class C1 { | public class C1 { |
| void m1( ){ | void m1( ) { |
| System.out.println("inside p1.c1.m1"); | System.out.println("inside p1.c1.m1"); |
| C2 c2 = new C2( ); | C2 c2 = new C2( ); |
| c2.m1( ); | c2.m1( ); |
| System.out.println("finished p1.c1.m1"); | System.out.println("finished p1.c1.m1"); |
| } | } |
| void m2( ){ | void m2( ) { |
| System.out.println("inside p1.c1.m2"); | /** |
| C3 c3 = new C3( ); | Block 1 |
| c3.m1( ); | */ |
| System.out.println("finished p1.c1.m2"); | System.out.println("inside p1.c1.m2"); |
| } | C3 c3 = new C3( ); |
| void m4(int count){ | /** |

TABLE 1-continued

| Original source code | Tagged Source code |
|---|---|
| for(int i=0;i<count;i++){<br>C2 c2 = new C2( );<br>c2.m6(5);<br>}<br>}<br>public static void main(String args[ ]){<br>int x=0,y=0;<br>C1 c1 = new C1( );<br>c1.m2( );<br>C2 c2 = new C2( );<br>c2.m2( );<br>if(c1 instanceof C1){<br>System.out.print("c1->C1");<br>}<br>else{<br>System.out.println("c1!->C1");<br>}<br>for(int l=0;l<5;l++){<br>c1.m3( );<br>for(int m=0;m<3;m++){<br>System.out.println("inside nested loop");<br>}<br>}<br>}<br>} | Block 2<br>*/<br>c3.m1( );<br>System.out.println("finished p1.c1.m2");<br>}<br>void m4(int count) {<br>/**<br>Block 1<br>*/<br>for (int i = 0; i < count; i++) {<br>C2 c2 = new C2( );<br>/**<br>Block 2,Block 3,Block 4,<br>Block 5,Block 6<br>*/<br>c2.m6(5);<br>}<br>}<br>public static void<br>main(String[ ] args) {<br>/**<br>Block 1<br>*/<br>int x = 0;<br>int y = 0;<br>C1 c1 = new C1( );<br>/**<br>Block 2<br>*/<br>c1.m2( );<br>C2 c2 = new C2( );<br>/**<br>Block 3<br>*/<br>c2.m2( );<br>if (c1 instanceof C1) {<br>System.out.print("c1->C1");<br>}else {<br>System.out.println("c1!->C1");<br>}<br>for (int l = 0; l <5; l++) {<br>/**<br>Block 4,Block 5,Block 6,<br>Block7,Block 8<br>*/<br>c1.m3( );<br>for (int m = 0; m < 3; m++) {<br>System.out.println("inside nested loop");<br>}<br>}<br>}<br>} |

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method for demarcating information, the method comprising:

parsing, by a computing device, source code of an application to generate an abstract syntax tree;

generating, by the computing device, an instrumented code from the abstract syntax tree;

compiling, by the computing device, the instrumented code along with a dynamic analysis code;

creating, by the computing device, one or more blocks in the source code of the application when one or more subroutines defined in the dynamic analysis code are called during a dynamic analysis of the instrumented code;

storing, by the computing device, information related to the one or more blocks in the source code of the application in a Hash Map; and annotating, by the computing device, the information related to the one or more blocks in the source code of the application into the source code of the application by inserting one or more comments into the abstract syntax tree based on the information related to the one or more blocks in the source code of the application stored in the Hash Map.

2. The method as claimed in claim 1, wherein the generating, by the computing device, an instrumented code from the abstract syntax tree further comprises adding, by the computing device, one or more nodes to the abstract syntax tree to capture the information related to the one or more blocks in the source code of the application.

3. The method as claimed in claim 1, wherein the one or more blocks in the source code of the application are represented in a directed acyclic graph.

4. The method as claimed in claim 1, wherein the information related to the one or more blocks in the source code of the application includes one or more block IDs and one or more block numbers.

5. The method as claimed in claim 4, wherein the one or more block IDs are generated during the dynamic analysis of the instrumented code.

6. The method as claimed in claim 4, wherein the one or more block IDs include package name, class name and line numbers of the source code of the application where the one or more blocks are created.

7. The method as claimed in claim 4, wherein the Hash Map stores information related to the one or more block IDs as one or more key entries and information related to the one or more block numbers as one or more values.

8. The method as claimed in claim 4, wherein the annotating, by the computing device, the information related to the one or more blocks in the source code of the application into the source code of the application further comprises inserting, by the computing device, the one or more block numbers into the abstract syntax tree to denote the one or more block IDs.

9. A system for demarcating information comprising:

a processor in operable communication with a non-transitory processor readable storage medium, the non-transitory processor readable storage medium containing one or more programming instructions, which when executed by the processor cause the processor to perform steps comprising:

parsing source code of an application to generate an abstract syntax tree;

generating an instrumented code from the abstract syntax tree;

compiling the instrumented code along with a dynamic analysis code;

creating one or more blocks in the source code of the application when one or more subroutines defined in the dynamic analysis code are called during a dynamic analysis of the instrumented code;

storing information related to the one or more blocks in the source code of the application in a Hash Map; and annotating the information related to the one or more blocks in the source code of the application into the source code of the application by inserting one or more comments into the abstract syntax tree based on the information related to the one or more blocks in the source code of the application stored in the Hash Map.

10. The system as claimed in claim 9, wherein the generating an instrumented code from the abstract syntax tree further comprises adding one or more nodes to the abstract syntax tree to capture the information related to the one or more blocks in the source code of the application.

11. The system as claimed in claim 9, wherein the one or more blocks in the source code of the application are represented in a directed acyclic graph.

12. The system as claimed in claim 9, wherein the information related to the one or more blocks in the source code of the application includes one or more block IDs and one or more block numbers.

13. The system as claimed in claim 12, wherein the one or more block IDs are generated during the dynamic analysis of the instrumented code.

14. The system as claimed in claim 12, wherein the one or more block IDs include package name, class name and line numbers of the source code of the application where the one or more blocks are created.

15. The system as claimed in claim 12, wherein the Hash Map stores information related to the one or more block IDs as one or more key entries and information related to the one or more block numbers as one or more values.

16. The system as claimed in claim 12, wherein the annotating the information related to the one or more blocks in the source code of the application into the source code of the application further comprises inserting the one or more block numbers into the abstract syntax tree to denote the one or more block IDs.

17. A non-transitory computer readable medium having computer readable program code embodied therein for demarcating information, the computer readable program code storing a set of instructions comprising:

parsing source code of an application to generate an abstract syntax tree;

generating an instrumented code from the abstract syntax tree;

compiling the instrumented code along with a dynamic analysis code;

creating one or more blocks in the source code of the application when one or more subroutines defined in the dynamic analysis code are called during a dynamic analysis of the instrumented code;

storing information related to the one or more blocks in the source code of the application in a Hash Map; and annotating the information related to the one or more blocks in the source code of the application into the source code of the application by inserting one or more comments into the abstract syntax tree based on the information related to the one or more blocks in the source code of the application stored in the Hash Map.

18. The non-transitory computer readable medium as claimed in claim 17, wherein the information related to the one or more blocks in the source code of the application includes one or more block IDs and one or more block numbers.

19. The non-transitory computer readable medium as claimed in claim 18, wherein the annotating the information related to the one or more blocks in the source code of the application into the source code of the application further comprises inserting the one or more block numbers into the abstract syntax tree to denote the one or more block IDs.

20. The non-transitory computer readable medium as claimed in claim 18, wherein the one or more block IDs are generated during the dynamic analysis of the instrumented code.

21. The non-transitory computer readable medium as claimed in claim 18, wherein the one or more block IDs include package name, class name and line numbers of the source code of the application where the one or more blocks are created.

22. The non-transitory computer readable medium as claimed in claim 18, wherein the Hash Map stores information related to the one or more block IDs as one or more key entries and information related to the one or more block numbers as one or more values.

23. The non-transitory computer readable medium as claimed in claim 17, wherein the generating an instrumented code from the abstract syntax tree further comprises adding one or more nodes to the abstract syntax tree to capture the information related to the one or more blocks in the source code of the application.

24. The non-transitory computer readable medium as claimed in claim 17, wherein the one or more blocks in the source code of the application are represented in a directed acyclic graph.

* * * * *